United States Patent [19]

Foreman et al.

[11] Patent Number: 4,862,349
[45] Date of Patent: Aug. 29, 1989

[54] METHOD FOR EXTRACTING AND/OR REPLACING CONTROL SYSTEM INFORMATION IN A COMPUTER OPERATING SYSTEM

[75] Inventors: Dennis J. Foreman, Binghamton; David A. Hellenga; Richard K. Hill, both of Endwell, all of N.Y.

[73] Assignee: International Business Machines Corporation, Armonk, N.Y.

[21] Appl. No.: 109,367

[22] Filed: Oct. 19, 1987

[51] Int. Cl.[4] .......................... G06F 9/46; G06F 12/06
[52] U.S. Cl. .................................. 364/200; 364/255.7; 364/262.5; 364/280; 364/228.2
[58] Field of Search ... 364/200 MS File, 900 MS File

[56] References Cited

U.S. PATENT DOCUMENTS

| | | | |
|---|---|---|---|
| 4,084,244 | 4/1978 | Appell | 364/200 |
| 4,253,145 | 2/1981 | Goldberg | 364/200 |
| 4,564,903 | 1/1986 | Guyette et al. | 364/200 |
| 4,730,249 | 3/1988 | O'Quin II et al. | 364/200 |
| 4,742,447 | 5/1988 | Duvall et al. | 364/200 |

Primary Examiner—Raulfe B. Zache
Assistant Examiner—Florin Munteanu-R
Attorney, Agent, or Firm—Pollock, Vande Sande & Priddy

[57] ABSTRACT

A method for extracting and replacing Control Block information in an operating system. An extract replace table is provided to permit application programmers to locate and in certain instances replace items contained in operating system Control Blocks. The user of the application program need not know the precise location of information contained in operating system Control Blocks. The extract/replace table will, upon formulating a request for either extracting or replacing Control Block items, find the requested items and read or replace them. Revisions of operating system programs may be made without regard to the new location of control items. The system user will locate and replace Control Block items by addressing the updated extract/replace tables.

10 Claims, 5 Drawing Sheets

|     |            |            |
|-----|------------|------------|
| 0   | ADTPTR     | ADTBWPTR   |
| 2   | ADTDTA     | ADTFDA     |
| 10  | ADTDFP1    | ADTDFP2    |
| 12  | ADTDFP3    | ADTHBCT    |
| 20  | ADTFSTC    | ADTCHBA    |
| 28  | ADTCFST    | ADTAMHO    |
| 30  | ADTAMHD    | OSADTSV1   |
| 38  | ADTLEFT    | ADTLAST — FLAG BYTE 1 |
| 40  | ////////// | A*1 A*2 A*3 A*4 |
| 42  | A*5 A*6 A*7 ////// | ADTDIOA |
| 50  | ADTDIOB    | ////////// |
| 58  | ADTMSK     | ADTAMP1    |
| 60  | ADTAMP2    | ADTAMP3    |
| 68  | ADTDAMAP   | ADTLHBA    |
| 70  | ADTLFST    | ADTANACW   |
| 78  | ADTARES    | ADTNXREC   |
| 80  | ADTXAREC   | ADTCHMAP   |
| 88  | ADTAHTAB   | ////////// |
| 90  | ADTIDENT   | ADTID      |
| 98  | (cont.) ] ADTVER | ADTDBSIZ |
| A0  | ADTDOP     | ADTCYL     |
| A8  | ADTMCYL    | ADTNUM     |
| B0  | ADTUSED    | ADTFSTSZ   |
| B8  | ADTNFST    | ADTDCRED   |
| C0  | (cont.) [ ////// ] | ADTOFFST |
| C8  | ////////////////////////////// | |

| PARAMETER INFORMATION NAME | CMS ACRONYM | NAME OF CONTROL BLOCK | OFFSET IN CONTROL BLOCK | LENGTH OF INFORMATION | INFORMATION TYPE | FLAGS | SPECIAL ROUTINE |
|---|---|---|---|---|---|---|---|
| CMS READ/WRITE DISK | ADTFRW | ADTSECT | ADTFLG1 | — | T9 | 0040 | — |
| VERTICAL MEMORY | VM SIZE | NUCOM | VM SIZE | L*VM SIZE | T4 | — | 0 |
| ACCESS MODE | AOTM | ADTSECT | AOTM | — | T1 | — | 0 |

TABLE I

| CONTROL BLOCK NAME | MAPPING MACRO FOR CONTROL BLOCK | ROUTINE TO IDENTIFY FIRST CONTROL BLOCK LOCATION | OFFSET IN CONTROL BLOCK POINTING TO NEXT CONTROL BLOCK IN CHAIN | FLAGS IDENTIFY KIND OF CONTROL BLOCK |
|---|---|---|---|---|
| ADTSECT | ADT | ERXSPADT | 0 | 6000 |
| NUCON | NUCON | 0 | 0 | 0000 |

TABLE II

METHOD FOR EXTRACTING AND/OR REPLACING CONTROL SYSTEM INFORMATION IN A COMPUTER OPERATING SYSTEM

FIELD OF THE INVENTION

A method for permitting application programmers to access certain user information contained in an operating system program. Specifically, a method is provided for extracting and/or replacing data in an operating system.

BACKGROUND OF THE INVENTION

Application programs for computer systems are written in various high-level languages for permitting processing of data in accordance with a desired computational scheme. Application programs are very often implemented using information from the underlying operating system program. In the organization of a digital computer system, an underlying operating system program acts as an intermediary between the system hardware and the user. The main function of the operating system is to manage resources such as external printers, disk drives, display units, etc. The operating system will provide for the control of these devices as well as the expeditious transfer of both data and control between various hardware components.

Application programmers will very often use control system data (items) to formulate an application program. For instance, an application program may need to access storage information for writing on available memory space. In order to efficiently carry out the write operation, the programmer may need to know certain items associated with writing to a memory disk. Additionally, other items contained within the operating system program such as memory size, the location of certain input/output routines, are necessary to write an application program which efficiently utilizes the computer system hardware for executing the application program.

In one such system implemented on a mainframe computer, the VM/SP system, there are two levels of operating system protocol. The first level, the Control Program (CP) serves, as previously described, to control the actions of the real machine. It also serves to create logical partitions of the main memory of the computer. Each of the logical partitions becomes effectively a separate computer known as a Virtual Machine. A user, gaining access to such a Virtual Machine via a display device or terminal, is given the appearance of having his own computer.

To make this Virtual Machine more usable for problem solving, the second layer of operating system, the Conversational Monitor System (CMS) is loaded into the virtual storage of this Virtual Machine. This second layer of operating system provides such amenities as a file management system, command execution facilities, language processors and communications, to mention just a few features. The operating system keeps track of its own and user actions via collections of data items. Related data items are stored in a structure known as a Control Block or Data Area.

The CMS architecture is described more particularly in IBM documentation entitled "CMS Data Areas and Control Block Logic", copyright IBM Corporation, 1984. This second level of protocol is itself an operating system for each of the virtual machines. Some of the CMS architecture is dedicated to an individual virtual machine and others are allocated to each virtual machine on the basis of need. Common routines, such as input/output routines, are shared among these virtual machines.

As with other operating system programs, the CMS operating system is periodically updated to provide additional features and efficiencies for CMS virtual machine users. The particular items and their locations in the CMS operating system which are used by various application programmers in writing their programs, may change as a result of such revisions. Specifically, Control Block items for the operating system may be stored at a different location than in an earlier version, or in some cases have a different structure. Therefore, it is necessary to recompile each application program written on a previous version of the operating system, replacing the information used in the old operating system with that of a new operating system.

The present invention provides a convenient way for suppliers of an updated version of an operating system to permit an application program to be revised without knowing the actual location of a given item. The application programmer need only request a given item, and the present invention will locate that item and in some instances, permit changes of the item in accordance with an EXTRACT/REPLACE request made by an application programmer.

SUMMARY OF THE INVENTION

It is an object of this invention to provide Control Block information contained in an operating system program to a user without identifying the location of this information.

It is a particular object of this invention to provide a method to locate a specific control item of a Control Block in an operating system.

The present invention provides a table containing information identifying the location of Control Block items, in the operating system. The extract/replace table is accessed by an application program by requesting the data by a common information name, as well as identifying a desired storage space for transfer of the data. Additionally, the table can be organized to permit only reading of certain items and prohibiting a user from changing the located data.

A mainline program is included as part of the operating system which will address the tables from a given request, and, based upon the table information, extract or replace the requested item. Thus, a user need not know where any particular item is located in the operating system, as the extract/replace table contained in the operating system will identify the location of the Control Block containing the requested item, and the mapping routines necessary to locate the information within the Control Block. The mainline program associated with the method will supply the requested item to a user designated buffer memory location.

The invention has particular use in operating systems for virtual machine applications. Additional to reading or replacing specific items of the operating system, the table and programming steps associated with locating and extracting the information can permit a search to be conducted of operating system Control Blocks using the same or different search arguments. Additionally, the present method will provide the ability to go back to a previous search point and continue searching other Control Blocks for information to be read or replaced.

BRIEF DESCRIPTION OF THE FIGURES

FIG. 3 illustrates the organization of the extract/replace table for locating Control Block information.

FIG. 4 illustrates the organization of a Control Block named ADTSECT, an Active Disk Table, in the CMS operating system.

DESCRIPTION OF THE PREFERRED EMBODIMENT

Figure 1:
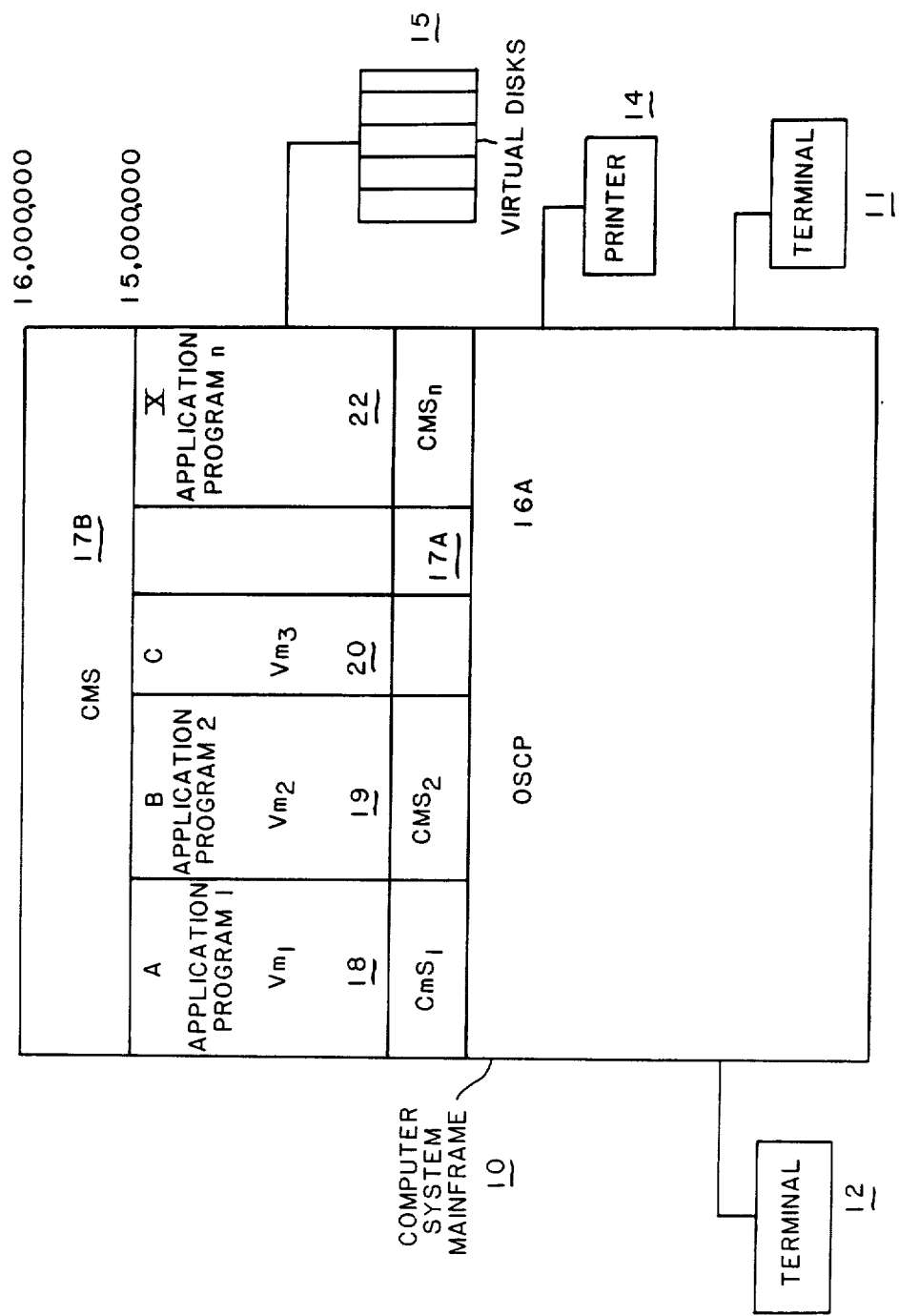
FIG. 1 illustrates the computing system mainframe organization with respect to peripheral devices and operating system control program for a CMS application.

Referring now to FIG. 1, there is shown the organization of a computing system mainframe for a virtual machine, VM, application. The computing system mainframe 10 includes an operating system control program 16a which organizes the data flow and system execution for the mainframe 10. Additional to operating system 16, there is a CMS operating system 17a and 17b for providing a plurality of virtual machines 18 through 22. The virtual machines provide independent access for a plurality of users to the computing system mainframe, by sharing the mainframe facilities. The CMS operating system for creating virtual machine applications is divided into a portion 17a dedicated to each virtual machine 18-22, and a common portion 17b; shared by all virtual machines 18-22.

The common CMS operating system 17b will also allow access to a plurality of virtual disks from a central disk file 15. The virtual disks may be accessed by one of the virtual machine applications 18 through 22. This will provide storage which may be necessary in executing an application program on the virtual machines.

The common CMS operating system 17b will also provide control through the operating system to input output devices such as the printer 14 or each terminal 11, 12. Terminals 11 and 12 may, of course, be the user input device for any one of the virtual machines assigned to a user.

Figure 2:
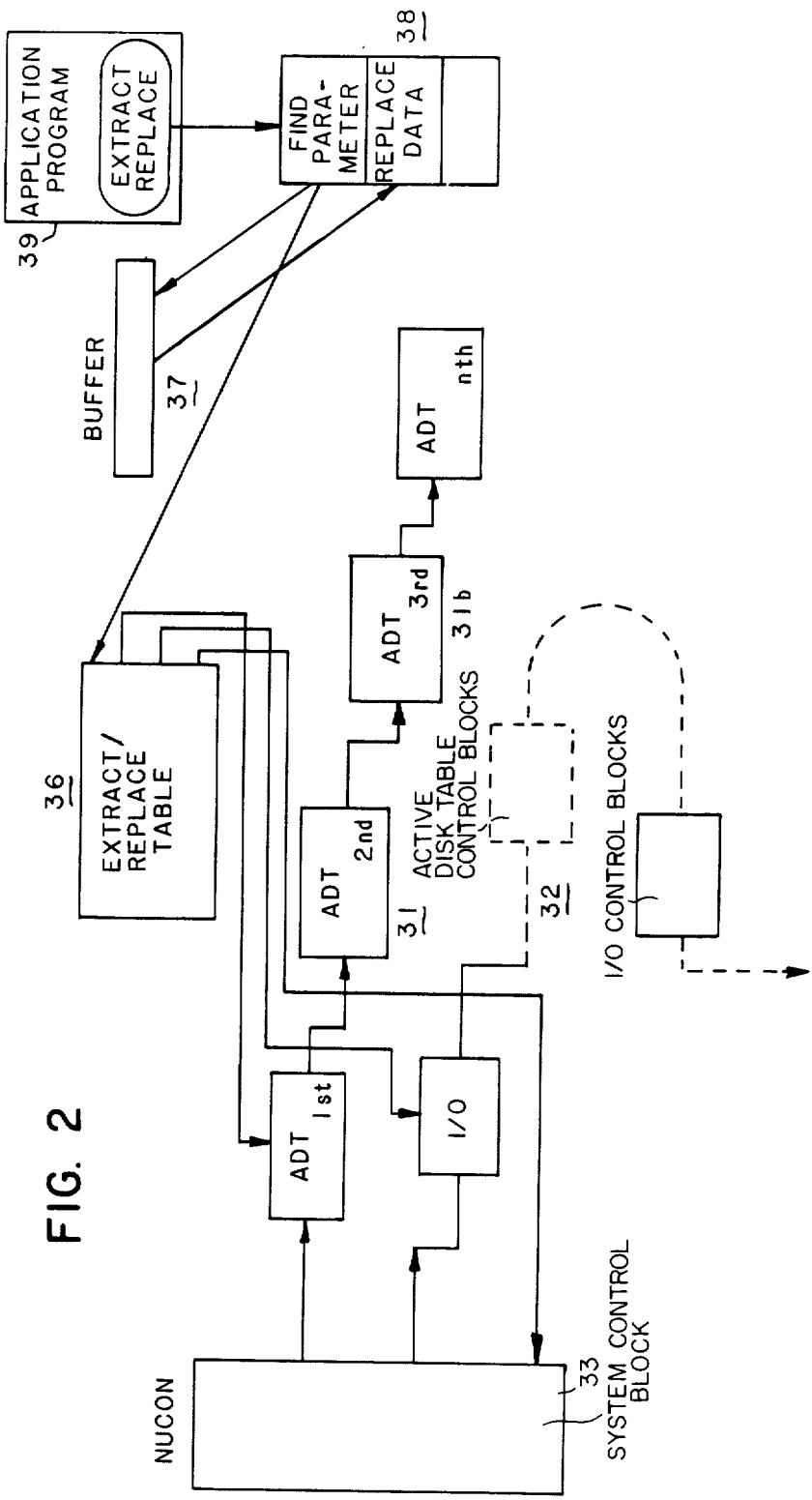
FIG. 2 illustrates the organization of Control Blocks in the CMS operating system.

FIG. 2 illustrates the organization of a portion of the information maintained by the CMS operating system. The software is organized such that a plurality of Control Blocks contain information common to a particular task or function being executed by the CMS operating system. The first of such plurality of Control Blocks, 31, is shown to be ADT, or active disk tables, for describing the attributes of virtual disks provided for a virtual machine. The virtual disks, of course, are storage locations contained in a main disk memory 15, which are available to a virtual machine user for temporary storage of computations being made by the machine. These Control Blocks are numbered 1 to n.

Other Control Blocks shown are input/output 32 and NUCON 33. These Control Blocks similarly contain tables of items unique to a particular task such as input/output transfer of data to and from the computing system mainframe 10, as well as overall system control NUCON 33. NUCON 33 illustrates how central control is effected over the various Control Blocks and the tasks which they represent for the CMS architecture.

Each of the Control Blocks shown in FIG. 2 contain data that an application programmer will need to efficiently write and execute an application program. For instance, when temporary disk storage is needed, an application programmer will have to inquire with a given Control Block related to the available active disk space in order to determine whether or not the disk space is available for the particular use, i.e., read/write or read only.

The present invention provides a convenient means for requesting information contained in a given Control Block. The present invention, through the use of an extract/ replace table 36 will provide for accessing information in any Control Block without the user knowing the precise location of this information.

The table 36 is organized so that a request made through an application program stub 39 for information supported by the extract/replace table 36 will be identified as to a Control Block, or a chain of Control Blocks which contains this information. When an EXTRACT request is made, request 39 contained in the application program stub will identify the information sought, the location of a buffer 37 to have the information transferred when found, and other information to be described more specifically with the following figures. However, for the overall description directed to FIG. 2, this request 39 can be seen to be processed by the mainline programming 38 which will locate the related Control Block from information contained in extract/replace table 36. Once the Control Block location has been determined, the mainline programming will conduct a search of each Control Block in a chain or otherwise related group of Control Blocks for the particular item. The application user need not know the specific location of a Control Block or the information in the Control Block. Rather, the extract/replace table 36 will, in response to a request of a Control Block item, locate the identity of the Control Block containing this information, and supply other pertinent information for permitting the mainline program 38 to locate and/or replace the data.

In a REPLACE request, the program still will identify the location of the new replacement data to be inserted. The Control Block information will be searched as in the EXTRACT request, but the replacement data will be transferred from buffer 37 to the Control Block location having this information.

Turning now to FIG. 3, there is shown the organization of one of the Control Blocks 31. This organization, as set forth in the IBM publication "VM/SP Data Areas and Control Blocks Logic" (1984) demonstrates the organization of the active disk table ADT. The first address, having a hex displacement of zero, contains the pointer to the next ADT block in the chain. Thus, one accessing the ADT block will, at the first location, learn the address for the next block of related control data.

One of the displacements, 46, -1a*3, contains FLAG BYTE 1 as set forth in the foregoing CMS data areas and Control Block Logic Manual, contains information relating to the availability of a virtual CMS disk. Depending on the data contained in this location, the user either has a CMS read only disk or a CMS read/write disk. This constitutes an example only of some of the information contained in the virtual disk Control Blocks. Referring to the aboveidentified manual will, of course, provide programmers with the remaining data contained in the active disk table (ADT).

These Control Blocks for the active disk table, and the locations containing information of interest within the Control Block may be conveniently accessed by the extract/ replace table 36.

Turning now to FIG. 4, there is shown the organization of the extract replace table 36. This table is shown as two tables, Table 1 and Table 2.

Table 1 contains item information requestable by the application program when a request is formulated by the stub 39. The Table identifies the CMS acronym, as well as the name of the Control Block which includes the particular item. The offset in the Control Block containing the item FLAG BYTE 1 which is requested by "CMS read/write" is identified in the fourth column of Table 1. The length of this information, as well as the information type, is included in columns 5 and 6. The length of information indicates that it is one bit of information, which will identify whether or not the CMS read/write disk of a particular Control Block has a READ ONLY or READ/WRITE availability. Those programmers familiar with the foregoing CMS document will recognize that a 1 indicates a WRITE capability and a zero a READ ONLY capability. The information type is illustrated as T9, indicating that this is boolean data rather than alphanumeric or other symbol data. Certain flags and a special routine column are indicated when the mainline program requires additional information to locate the requested information. Other flags will prohibit a replacement of certain information, permitting only an extract function.

Table 2 is accessed by the name of the Control Block identified in Table 1. The Control Block name is associated with a mapping macro which the operating system will use to map the area in memory against a known format of the Control Block. The routines necessary for the mainline program 38 to locate the address of stored information is identified in the third column of Table 2. Column 4 will indicate the offset address in the Control Block which contains the position of the next Control Block in a chain. For the entry ADTSECT this occurs a address 0 as was demonstrated with respect to the preceding FIG. 3. Additional flags may be needed as provided in column 5 of Table 2 for identifying the type of Control Block identified with the Table.

Thus, it is seen that when the system receives a request for information contained in the first column of Table 1, the identity of the Control Block and all the necessary information to access the requested information is given by Tables I and II, which together comprise table 36.

Figure 5:
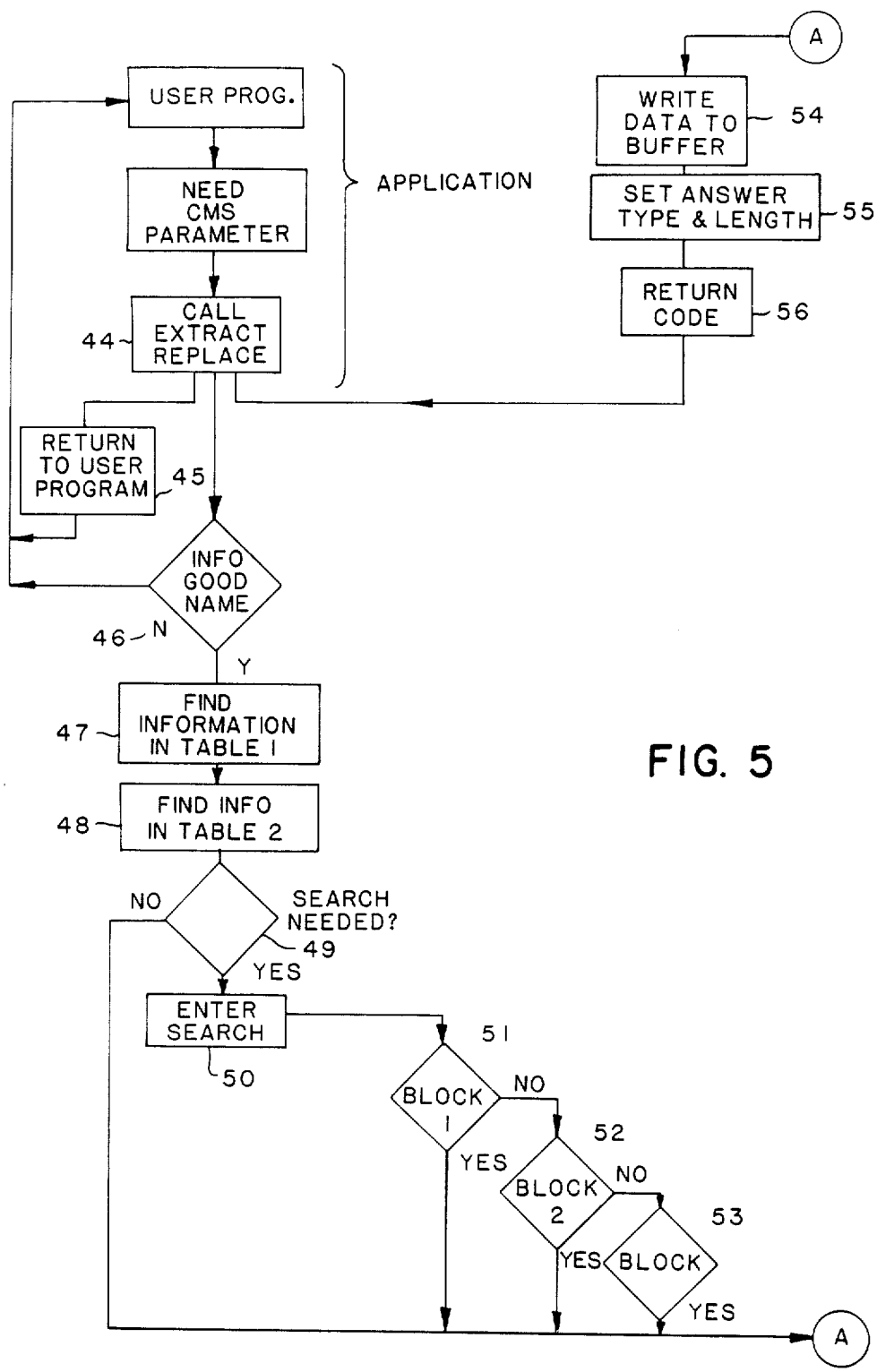
FIG. 5 demonstrates the operation of the mainline code and stub code for locating and reading or replacing information in the operating system Control Blocks.

Having thus located the Control Blocks containing data being requested by the application programmer, the mainline programming 38 will further search the Control Blocks for the requested information. The mainline control program is illustrated more particularly in FIG. 5. This Figure will be described with respect to a request by an application program to either locate the virtual memory size, or to find a CMS READ/WRITE virtual disk location.

To request the virtual memory size available to a particular virtual machine, the application programmer would, within the application program, formulate a request in the following format:

CALL DMSERP (RETCODE, "EXTRACT", NUMBER SEARCH ARGUMENTS, INFORMATION NAME, ANS LOCATION, ANS TYPE, ANS LENGTH, FLAGS, SEARCH TYPE, TOKEN)

This request will instruct DMSERP, the internal name for Extract/Replace, to search for the INFORMATION NAME, in this case VMSIZE which is the acronym for the virtual memory size. The function Extract/Replace is to perform is indicated by "EXTRACT", which is one of the two functions which Extract/Replace is able to perform, the other being "REPLACE".

Having received the request, the Extract/Replace mainline code is entered in 46. The first column in Table 1 will be searched looking for the INFORMATION NAME, in this case VMSIZE. Assuming it is found, the third column in Table 1 corresponding to VMSIZE will identify the CONTROL BLOCK NAME in which VMSIZE can be found in step 47. This CONTROL BLOCK NAME will identify a corresponding entry in the first column of Table 2. At this time, if there is a special routine in column 3 of Table 2, it can be called in step 48 in order to find the location of the Control Block within the virtual machine. Once the Control Block has been located, the MAPPING MACRO, located in column 2 of Table 2, is used to determine the shape or format of the Control Block. Since the virtual memory size (VMSIZE) occurs only once in a virtual machine within a control block called NUCON, and since the NUCON control block is always located at location 0 within any virtual machine, there is no need for a special routine or search as determined in step 49 and therefore column 3 of Table 2 will contain a 0.

Now the NUCON Control Block has been found, column 4 in Table 1 will contain the offset within the Control Block where the VMSIZE information can be found. Column 5 in Table 1 will contain the length of the information comprising VMSIZE. Column 6 in Table 1 will contain an identifier which tells what kind of information is VMSIZE, in this case it is numeric. The other kinds of information are character strings, addresses, or boolean indicators. Through using columns 4, 5 and 6 of Table 1, the information VMSIZE can be precisely located and described. The value for VMSIZE will be retrieved from the Control Block in step 54 and returned to the application program within the ANS LOCATION buffer provided by the application programmer within the request. The length of the information will be returned within the ANS LENGTH buffer and the type of the information, in this case numeric, will be returned within the ANS TYPE buffer in step 55. The RETCODE buffer provided within the request will be filled in with an indicator in step 56 telling of the success or failure of the request. In the case of a successful request, the RETCODE buffer will be filled in with a 0. If there happened to be any errors encountered during Extract/Replace processing, the RETCODE buffer could be filled with a unique non-zero value indicating a specific error or reason for failure.

Since VMSIZE occurs only once in a virtual machine, there was no need to perform any searching and therefore the application programmer did not need to provide any search arguments. The NUMBER SEARCH ARGUMENTS portion of the request would be 0, the SEARCH TYPE portion would be blank and the FLAGS portion would be 0.

The foregoing steps described the process for locating a single occurrence of data. There are many cases within a virtual machine where there is a plurality of similar types of data. This plurality of data is contained within a series of identical Control Blocks which have been chained or otherwise positioned together. An example of this is that the CMS operating system allows a user to maintain a plurality of virtual disks on which to keep information or files. Each of these virtual disks is described by a Control Block which contains all the information needed by the virtual machine to operate the virtual disk. If a user has a plurality of these virtual disks, the system will maintain a plurality of similar Control Blocks, all chained together, with the first Control Block pointing to the next and so on to the last Control Block. If the application programmer wishes to get information from these Control Blocks, the programmer must provide one or more search arguments in order to tell Extract/Replace from which of these similar chained Control Blocks the information is to come.

All of the information concerning virtual disks are contained within a Control Block called the ADT (or Active Disk Table). Two of the many pieces of information within the ADT are the Access Mode and the Read/Write Indicator. The Access Mode is a character A thru Z which is a shorthand identifier for a particular virtual disk. The Read/Write Indicator tells whether the virtual disk can be written to or can only be read. It will contain a value of 1 if it can be written to or a value of 0 if it can only be read. Let us assume that an application programmer needs to know the Access Mode of a virtual disk on which information can be written. Within the application program the following request would be formulated:

CALL DMSERP (RETCODE, "EXTRACT", NUMBER SEARCH ARGUMENTS, INFORMATION NAME, ANS LOCATION, ANS TYPE, ANS LENGTH, FLAGS, SEARCH TYPE, TOKEN SEARCH NAME, SEARCH VALUE, SEARCH LENGTH, SEARCH TYPE, COMPARE TYPE)

This request in step 44 will instruct DMSERP, the internal name for Extract/Replace, to search for the INFORMATION NAME, in this case ACCESSMODE which is the acronym for the Access Mode. In order to tell Extract/Replace to get the ACCESSMODE of a virtual disk which can have data written to it, a search argument is passed. A search argument is comprised of the SEARCH NAME, SEARCH VALUE, SEARCH LENGTH, SEARCH TYPE and COMPARE TYPE. In this request, SEARCH NAME will be CMSREADWRITEDISK which is the acronym for the Read/Write Indicator. SEARCH VALUE will be 1, indicating to search for a value of 1 meaning the virtual disk can be written to. SEARCH LENGTH will be 1 since the length of the Read/Write indicator is 1 and the SEARCH TYPE will indicate that the type of data is an Indicator. COMPARE TYPE will be set to 'EQ' to cause an equality comparison to be done. THE NUMBER SEARCH ARGUMENTS portion of the request will contain a 1 indicating that only 1 search argument is being sent on the request. The search argument is validated in step 46 before the search begins.

Table 1 and 2 will be consulted in steps 47 and 48 in a manner similar to the example of VMSIZE above. Column 4 in Table 2 will tell Extract/Replace that a search routine must be called to search through all of the chained ADT Control Blocks in steps 51, 52, and 53 until a match is found satisfying the values passed in the search arguments.

After the specific ADT Control Block which is available as a READ/WRITE disk has been found, column 4 in Table 1 will contain the offset within the Control Block where the ACCESSMODE information can be found. The ACCESSMODE information is used by the application programmer to refer to the disk which has been located using the search routine. Column 5 in Table 1 will contain the length of the information comprising ACCESSMODE. Column 6 in Table 1 will contain an identifier which tells what kind of information is ACCESSMODE, in this case it is an indicator. Through using columns 4, 5, and 6 of Table 1, the information ACCESSMODE can be precisely located and described. The value for ACCESSMODE will be read from the Control Block and returned to the application program within the ANS LOCATION buffer provided by the application programmer within the request in step 54. The length of the information will be returned within the ANS LENGTH buffer and the type of the information, in this case character, will be returned within the ANS TYPE buffer in step 55. The RETCODE buffer provided within the request will be filled in with an indicator telling of the success or failure of the request in step 56. In the case of a successful request, the RETCODE buffer will be filled in with a 0. If there happened to be any errors encountered during Extract/Replace processing, the RETCODE buffer could be filled a unique non-zero value indicating a specific error or reason for failure.

From these two examples, VMSIZE and ACCESSMODE, it can be seen how an application programmer can utilize the Extract/Replace function in order to retrieve information from Control Blocks even though the programmer does not know the location of where that information or Control Blocks actually resides within the virtual machine. All of that information is contained or deduced from Tables 1 and 2. If the location of the information should happen to change during the next version of the virtual machine software, only Tables 1 and 2 would have to be updated and the application program will still operate correctly without having to be re-written or revised.

In a second aspect of the invention, provisions are provided to REPLACE system information instead of extracting it. The replacement of system information is very similar to the extraction of data, the difference being that the application programmer provides the new replacement data in the ANS LOCATION buffer. Tables 1 and 2 and the searching routines are used exactly as before to determine where the data resides within the virtual machine. Instead of extracting the data, however, the replacement data is put into the Control Block.

Thus, with respect to one embodiment of the invention, there has been described a method for accessing information in an operating system without knowing the actual location in the system for such information. Although described as having a special application to CMS operating systems, it is clear that the use of this method in other operating systems will be apparent by those skilled in the art.

Having thus described our invention, what we claim as new, and desire to secure by Letters Patent is:

1. A method for locating control information in a control program of a data processing system, said control program being organized as a plurality of Control Blocks identifying related items of control information, comprising:

organizing in a first table the identity of an items of information used in said application program along with the name of a related control block;

requesting in an application program instruction an item of said information as well as designating a storage location for receiving said information;

addressing said first table with said requested item of information to identify a Control Block containing said item of information;

a second table identifying individual data processing routines in said control program for locating said item of information and for supplying said information to a designated address, said second table being addressed in response to a Control Block identified in said first table; and, executing said individual data processing routines, whereby said information is located, and transferring said located information to said storage location requested by said application program.

2. The method of claim 1 wherein said first table includes along with said related Control Block name flags which enable said data processing system to read said information but prohibits replacing said information by said application program instruction.

3. The method of claim 1 wherein said first table includes information identifying the location in a Control block of said information requested by said application program instruction.

4. The method of claim 3 wherein said first table includes for each information requested the data length of said requested information.

5. A method for searching for control information contained in an operating system program stored in a data processing system without knowing the location of said information, comprising:

creating a search request in an application program contained in said data processing system for an information item to be searched, said request including said information identity, a storage location for said information, and a comparison criteria to validate located data as the type being searched;

organizing a plurality of searchable information items in a table along with the identity of a Control Block of said operating system containing each of said items, along with a routine and plurality of operative flags for instructing said processing system to locate and transfer a requested information item to said request storage location;

addressing said table of information items with said search request information identity, whereby a routine and plurality of operation flags are produced associated with said search request information item;

executing said routine until an information item is produced which meets a criteria contained in said search request; and, storing said produced information item at a location identified by said search request.

6. The method of searching information according to claim 5, wherein said table further identifies the location within said Control Blocks of a requested item.

7. The method of claim 5 further comprising replacing said produced information item in said Control Block with a user-supplied information item.

8. The method of claim 7 further comprising storing in said table an indicator with each of said items identifying whether said information item may be replaced.

9. In a virtual machine data processing system, a method for extracting control block information by an application program comprising:

organizing a table of entries, each entry including information identity identifying control block information which is accessible by said application program, as well as the location of each block identifying said control information, and a program routine for searching each block for said accessible information;

providing in said application program an instruction for requesting said information by said information identity and a buffer location for said accessed information to be transferred;

addressing said table with said requested information identity whereby control block locations are identified along with search routines for finding said requested information; and, searching each identified control block for said information, and storing said information in said buffer location.

10. The method of claim 9 further including a method for replacing said extracted information with user supplied replacement information comprising:

providing in said application program an instruction to replace said information, including a buffer location containing replacement information;

addressing said table with the identity of said information to be replaced whereby control block locations along with search routines for finding said identified information location within a control block are produced;

searching each control block location for said identified information location; and, inserting replacement data contained in a buffer identified by said buffer location at said identified information location within a located control block.

* * * * *